United States Patent [19]
Falconnet

[11] Patent Number: 5,485,384
[45] Date of Patent: Jan. 16, 1996

[54] ON-BOARD NAVIGATION SYSTEM FOR AN AERIAL CRAFT INCLUDING A SYNTHETIC APERTURE SIDEWAYS LOOKING RADAR

[75] Inventor: Bruno Falconnet, Verneuil Sur Seine, France

[73] Assignee: Aerospatiale Societe Nationale Industrielle, Paris, France

[21] Appl. No.: 116,337

[22] Filed: Sep. 3, 1993

[30] Foreign Application Priority Data

Sep. 3, 1992 [FR] France ................................. 92 10531

[51] Int. Cl.$^6$ .................................................. G06F 165/00
[52] U.S. Cl. ......................... 364/449; 364/454; 364/456; 342/25; 342/64
[58] Field of Search ....................... 364/443, 449, 364/453, 454, 456; 73/178 R; 342/25, 64, 63

[56] References Cited

U.S. PATENT DOCUMENTS

| | | | |
|---|---|---|---|
| 4,495,580 | 1/1985 | Keearns | 364/454 |
| 4,520,445 | 5/1985 | Keearns | 364/454 |
| 4,692,765 | 9/1987 | Politis et al. | 364/453 |
| 5,272,639 | 12/1993 | McGuffin | 364/454 |

OTHER PUBLICATIONS

IEEE Transactions on Aerospace and Electronic Ssytems, Mostafavi et al., "Image Correlation With Geometric Distortion," vol. AES14, No. 3, May 1978, pp. 487–500, New York.
IEEE Plans '90 Position Location and Navigation Symposium, Las Vegas, 20–23 Mar., 1990, Bevington et al., "Precision Aided Inertial Navigation Using SAR and Digital Map Data," pp. 490–496.

Primary Examiner—Gary Chin
Attorney, Agent, or Firm—Marshall, O'Toole, Gerstein, Murray & Borun

[57] ABSTRACT

On-board navigation system for an aerial craft of the type including an SAR synthetic aperture sideways looking radar (12). According to the invention, computing device (18) express the alignment deviation as a function of the estimation error vector $\Delta U$ associated with the state vector U consisting of the components of the vectors P, V for the position and relative velocity of the vehicle, in the form of a noise-affected observation, a KALMAN-BUCY filter with gain matrix K computing the estimate of the vector of estimation errors.

6 Claims, 2 Drawing Sheets

ON-BOARD NAVIGATION SYSTEM FOR AN AERIAL CRAFT INCLUDING A SYNTHETIC APERTURE SIDEWAYS LOOKING RADAR

BACKGROUND OF THE INVENTION

The present invention relates to an on-board navigation system for an aircraft, such as an airplane, a missile or a craft.

Navigation of aircraft, missiles or spacecraft is generally afforded by employing one or more inertial navigation facilities, possibly combined with an altimeter measurement. The errors of calibration and of implementation associated with such inertial equipment inevitably give rise to permanent impairment of the accuracy of navigation during the flight of such craft.

When this navigation error grows too large, it becomes necessary to make an adjustment to the inertial information via a complementary means.

Numerous adjustment sensing means may be envisaged, such as for example a GPS (Global Positioning System) system for location by satellite, TERCOM adjustment by altimeter correlation, stellar observation, visible or invisible imaging, etc., each being defined by conditions of implementation and associated limits of use. With the advent of on-board high resolution radars, accurate adjustment of navigation by radar imaging is becoming conceivable.

This is particularly the case when the craft is equipped with a synthetic aperture sideways looking radar, known as SAR radar, which is an autonomous system which can be used in any weather and at any time and which makes it possible to envisage very accurate and very full adjustment of navigation.

There has already been proposed to this end an on-board navigation system for an aerial craft, of the type which includes an inertial navigation facility that delivers an estimation of the position and velocity of the vehicle with respect to the terrestrial surface, an SAR synthetic aperture sideways looking radar that produces an SAR radar image of the territory in the vicinity of the point overflown by the vehicle, memory means that contains a reference map of the territory overflown, means for comparison that aligns an SAR radar image produced in flight with the stored reference map and provides an alignment deviation in two perpendicular directions and computing means linked to the memory means, to the inertial navigation facility and to the means of comparison, which include filter means of the KALMAN type, and which deliver an inceptor to the KALMAN filter for the estimation of the inertial errors in position and in velocity as a function of the alignment deviation $\delta$.

Such a system is described and represented in the document James E. Bevington-Charles A. Martilla (Honeywell Systems and Research Center)-Precision Aided Inertial Navigation Using SAR and Digital Map Data IEEE PLAN' 1990: "Position Location and Navigation Symposium Record", March 1990, pages 490–496.

These papers are based on modeling in which the alignment deviation $\delta$ is merged directly with the inertial error in the horizontal plane containing the two perpendicular directions or require the use of an altitude reference (altimeter).

This modeling does not make it possible to get back directly to the inertial errors in altitude and/or in velocity and, if these inertial errors in velocity or in altitude are too great, adjustment of the horizontal position is corrupted by substantial errors.

Summary of the Invention

The subject of the invention is a navigation system of the type mentioned above which makes it possible, on the one hand, to estimate and adjust the altitude and velocity of the vehicle or craft and, on the other hand, to take these altitude and velocity estimations into account in order to estimate and adjust the horizontal position of the vehicle with great accuracy, this being accomplished in the absence of any system for measuring altitude, such as a radio-altimeter, or for measuring velocity, such as a laser anemometer, other than the inertial navigation facility.

To this end, according to the invention, the navigation system is such that said computing means express the alignment deviation as a function of the estimation error vector $\Delta U$ associated with the state vector U consisting of the components of the vectors P, V for the position and relative velocity of the vehicle, in the form of a noise-affected observation $$\delta = \begin{vmatrix} \delta X \\ \delta Y \end{vmatrix} = \begin{vmatrix} \Delta X + f(\Delta Z, \Delta V) + \eta_x \\ \Delta Y + g(\Delta Z, \Delta V) + \eta_y \end{vmatrix}$$

in which:
  $\eta$ is the vector of alignment error in said two perpendicular directions $\eta x$, $\eta y$;
  $\Delta X$ and $\Delta Y$ represent the inertial error in position of the vehicle in said two horizontal perpendicular directions;
  $\Delta Z$ represents the inertial error in altitude of the vehicle;
  $\Delta V$ represents the vector of inertial errors in velocity of the vehicle; and
  $f(\Delta Z, \Delta V)$ and $g(\Delta Z, \Delta V)$ are two scalar functions;
and such that the filter is a KALMAN-BUCY filter with gain matrix K such that the estimate $\Delta^\wedge U$ of the vector of estimation errors is equal to $$\Delta^\wedge U = K.\delta$$

The invention also relates to a linear method of adjustment based on the linear terms and to an extended method making it possible to take into account the nonlinearities due to the inertial altitude errors.

The figures of the attached drawing will clearly elucidate the manner in which the invention may be embodied. In these figures, identical references denote similar elements.

DETAILED DESCRIPTION OF A PREFERRED EMBODIMENT

Figure 1:
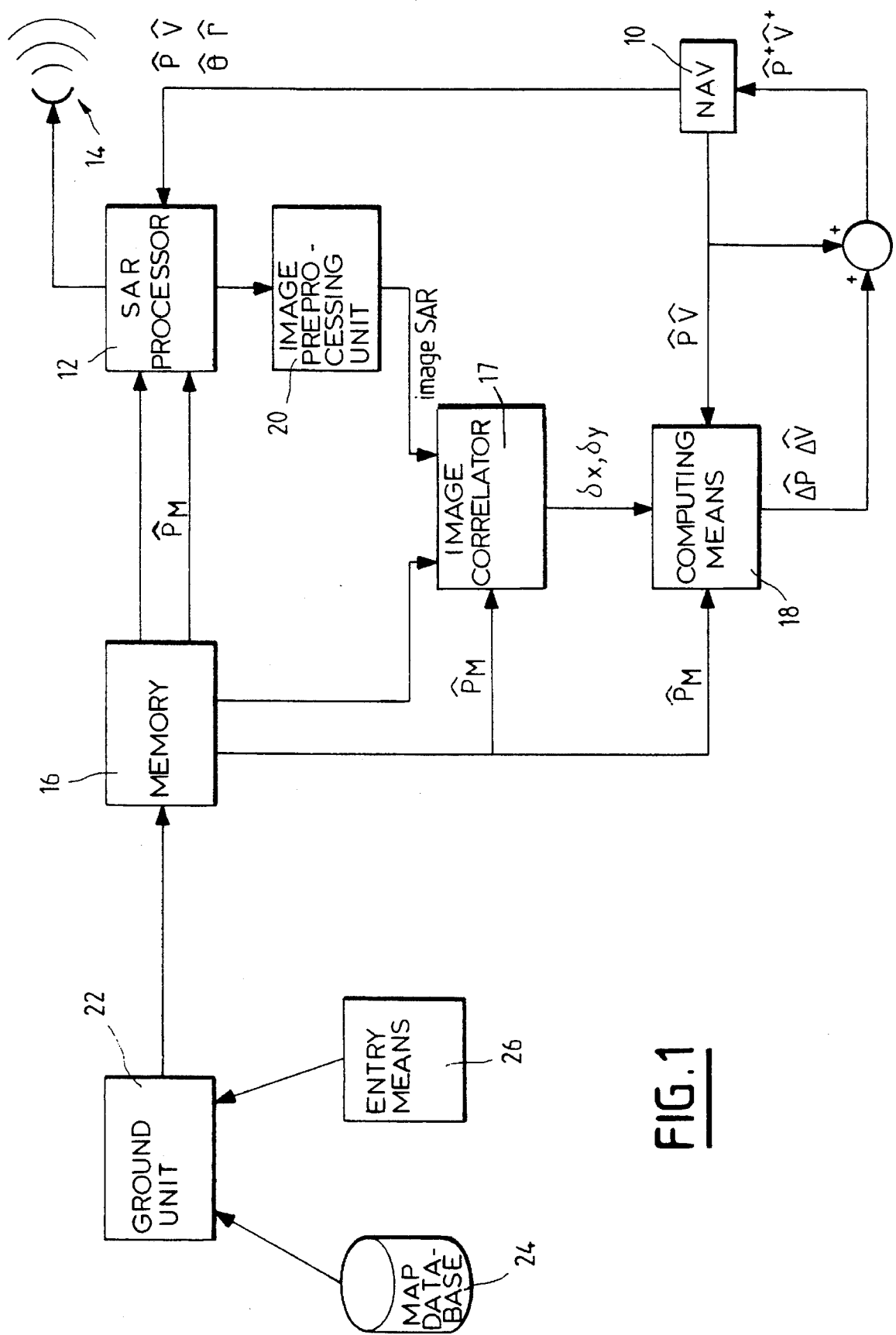
FIG. 1 is a block diagram illustrating the principles making up a navigation system according to the invention.

The elements 10 to 20 of the system illustrated in FIG. 1 are intended to be mounted on board an aerial mobile, such as an aircraft or a missile.

This on-board part of said system includes an inertial navigation facility 10, a synthetic aperture radar 12 equipped with its SAR processor and linked to an SAR antenna 14, on-board memories 16, an image correlator 17 and computing means 18 with a KALMAN-BUCY filter for the adjustment of navigation.

The image correlator 17 receives images from the SAR processor 12, after they are processed in an image preprocessing unit 20, and from the memory 16 in which are stored images of a reference map of the territory which the craft will overfly, and which have been stored therein, as well as other data such as a scenario for adjustment, prior to the flight, based on a ground unit 22 for mission preparation, which is linked to a map database 24 and to means 26 for entering mission parameters.

The navigation system and the method of adjustment implemented will now be described in further detail.

Flight mission preparation

On the basis of the parameters of the mission assigned to the craft, such as the trajectory, targets and overflown zones, preparation consists in preparing one or more so-called reference digital maps which will be loaded, before the start of the flight, into the memories 16 on board the craft.

These reference maps represent a specific modeling (radar levels, boundaries of details, zones of contrasts, etc.) of the terrain which the SAR radar will have occasion to image during the flight.

The reference maps may be corrupted by two types of errors:

map location errors within a reference trihedron; these errors are either absolute (adjustment of navigation at a cruising point), or relative (adjustment of navigation in the vicinity of a point to be reached: target, landing strip, landmark, etc.). These errors are, in practice, distributed approximately as isotropic, centered Gaussian random variables in the horizontal plane. They are therefore characterized by:

$\sigma_h$: the standard deviation of the horizontal location errors, $\sigma_z$: the standard deviation of the vertical location errors, radar measurement errors; these errors, which are very tricky to model, reflect ignorance of the exact nature of the terrain which will be imaged (seasonal variations, natural or human modification of the landscape, etc.).

Mission preparation may also embrace the definition of an adjustment scenario fixing, before the flight, the times (or altitudes) at which the various adjustments will be made, as well as the geometrical conditions of the various radar sightings to be carried out.

Inertial navigation

Navigation of the craft is afforded nominally by the inertial guidance facility 10. This facility, which may be of existing technology (with stabilized platform or with strapdown components), provides, on request by the on-board systems, an estimation of the vectors for the position $\hat{P}$, for the velocity relative to the terrestrial surface $\hat{V}$, for the attitude $\theta$ and for the current acceleration $\hat{\Gamma}$ of the craft. These estimations are, in a standard manner, provided by integrating the information available at the output of the accelerometers and rate gyros. During flight, the facility can accept an adjustment of its current navigation point, and in particular of the estimated position and estimated velocity of the craft.

Each of these estimations differs from the true situation by a deviation termed the "inertial error":

$$\begin{cases} P = \hat{P} + \Delta P \\ V = \hat{V} + \Delta V \\ \Theta = \hat{\Theta} + \Delta \Theta \\ \Gamma = \hat{\Gamma} + \Delta \Gamma \end{cases} \quad (1)$$

If the navigation computer is unbiased, these inertial errors are statistically centered (with zero mean). They are assumed to be Gaussian and are therefore characterized, at each instant of the flight, by a covariance matrix. It is also assumed that the navigation computer knows, at each instant $t_i$ of the flight, the covariance matrices associated with the errors in position and in relative velocity of the craft, for example via a method of propagating the initial covariance matrices:

$$\Sigma_P(t_i) = E[\Delta P.\Delta P^t](t_i)$$

$$\Sigma_V(t_i) = E[\Delta V.\Delta V^t](t_i) \quad (2)$$

$$\Sigma_{P_V}(t_i) = E[\Delta P.\Delta V^t](t_i)$$

We write $$U = \begin{vmatrix} P \\ V \end{vmatrix}$$

for the state vector consisting of the components of the position and relative velocity of the craft containing six state variables. The associated vector of estimation errors is $$\Delta U = \begin{vmatrix} \Delta P \\ \Delta V \end{vmatrix}$$

and is therefore characterized by its covariance matrix at the instant $t_i$:

$$\Sigma_U(t_i) = \begin{bmatrix} \Sigma_P(t_i) & \Sigma_{P_V}(t_i) \\ \Sigma_{P_V}^t(t_i) & \Sigma_V(t_i) \end{bmatrix} \quad (3)$$

SAR radar imaging

In what follows, the term SAR radar sensor denotes all the equipment and processing leading to the production of an SAR radar image (send/receive chain, SAR processing, image preprocessing, etc.).

The SAR radar sensor produces, at instants and under geometrical conditions which are fixed by the adjustment scenario, an SAR radar image of the terrain in the vicinity of the point overflown.

The SAR processing module 12, termed the SAR processor, relies on the craft's position and velocity information provided by the facility 10. Certain operating modes (error compensation, trajectory followed at non-constant speed) may also require the use of attitude and acceleration information for the craft, likewise provided by the facility 10.

The definition of an SAR processor is, today, a widely studied classical problem and examples of it may be found in the documents:

R. O. HARGER-Synthetic Aperture Radar Systems-New York, Academic Press, 1970.

A. W. RIHACZEK-Principles of High Resolution Radar-New York, MacGraw Hill, 1969.

The output from the sensor is a high resolution radar image of the terrain. Like the reference map, this image is corrupted by errors:

owing to the inertial errors in position and in velocity, the center of the image produced does not correspond exactly with the center of the image which it is desired to produce. Some of these inertial errors (altitude and velocity) also entail a slight deformation of the geometry of the image produced;

coherent processing of the radar signal necessarily engenders noise which is very characteristic of SAR images, called speckle. This noise is manifested in the form of a mottling of the SAR image.

This image later undergoes several preprocessing operations (filtering of the speckle, contour extraction, thresholding, etc.) in the means 20 before being used in the alignment procedure.

Alignment by the image correlator

The image correlator 16 carries out the alignment, also called Map-Matching, of the SAR image generated in flight, with the on-board reference map. Very many techniques of alignment are known.

On completion of the alignment procedure, the correlator delivers a two-dimensional deviation $$\delta = \begin{vmatrix} \delta_x \\ \delta_y \end{vmatrix}$$

representing, to within an alignment error $$\eta = \begin{vmatrix} \eta_x \\ \eta_y \end{vmatrix}$$

the displacement of the center of the SAR image produced with respect to the center of the SAR image which it was desired to produce.

This deviation $\delta$ is generally evaluated in two perpendicular directions chosen arbitrarily. The error $\eta$ represents the accuracy of the alignment procedure.

Theoretical evaluation of the performance of this procedure forms the subject, for example, of the document H. MOSTAFAVI-F. SMITH (Systems Control)-Image Correlation with Geometric Distorsion-Part I: Acquisition Performance-Part II: Effect on Local Accuracy-IEEE Transactions, vol. AES-14, pages 487–500, May 1978.

The alignment error $\eta$ can be characterized as a centered Gaussian error whose covariance matrix $\Sigma\eta$, of size 2×2, is obtained analytically as a function:

of the dimensioning parameters of the SAR sensor (resolution, image size, signal-to-noise ratio, etc.);

of the kinematics of the trajectory (direction of sight, altitude, velocity, slope, etc.);

of the errors present in the system (inertial errors, numerical processing errors, mapping errors, noise, etc.);

of the statistical nature of the terrain imaged (length of correlation).

A relatively simplified, but nevertheless sufficiently realistic, expression for the covariance matrix $\Sigma\eta$ will be given below.

Adjustment of navigation

The invention relates to the actual adjustment of navigation. The implementation of this adjustment breaks down into three steps:

modeling of the geometry of SAR image capture;

modeling of the alignment deviation $\delta$;

definition of the filtering of the measurements $\delta$ and adjustment of the current point of navigation.

Definition of the computational reference frame

Figure 2:
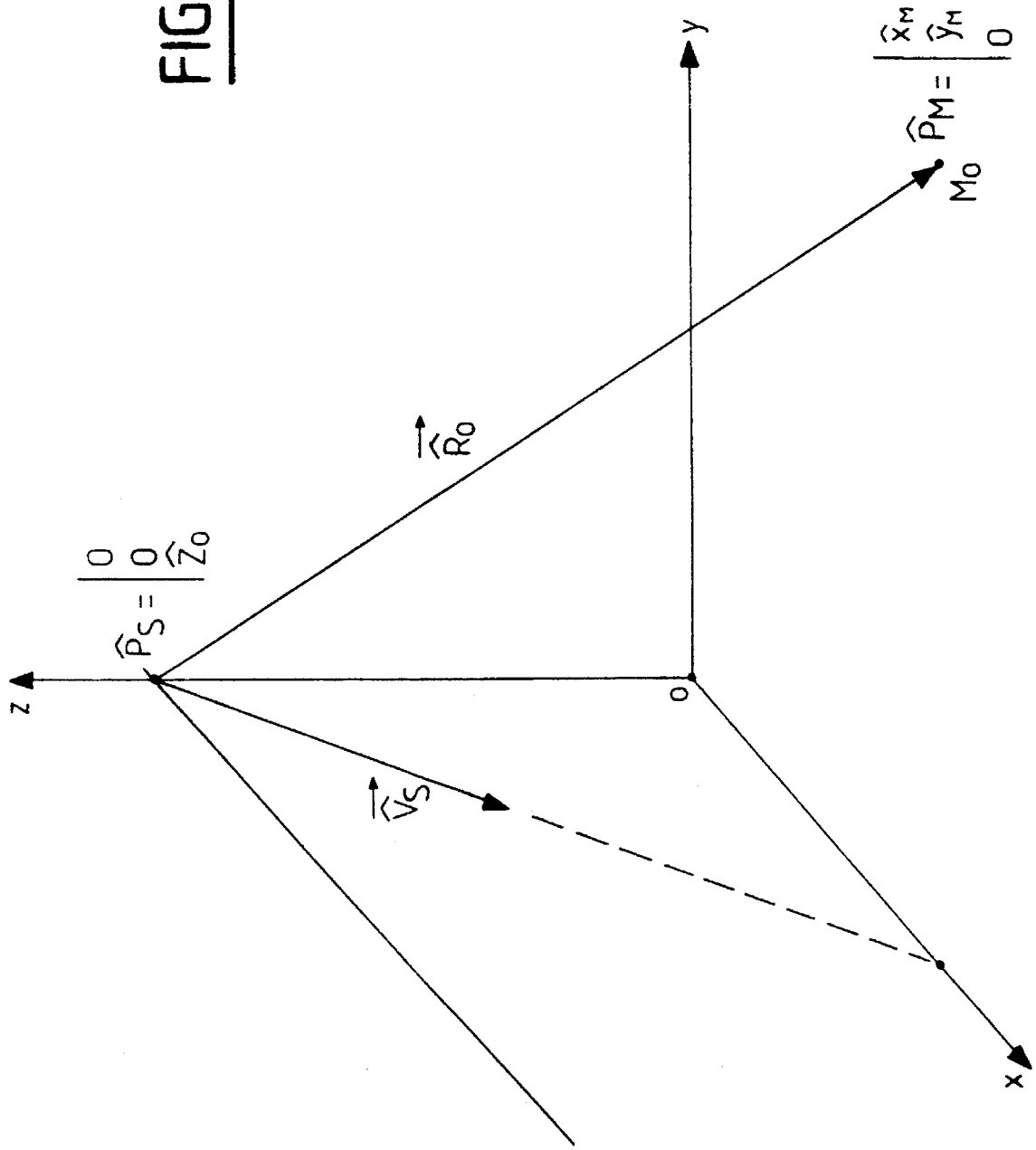
FIG. 2 is a diagram making it possible to define the parameters required for the explanations which will follow, relating to the method of adjustment implemented within the navigation system according to the invention.

Let $T=(O, X, Y, Z)$ be the orthonormal reference frame defined, at the estimated current point of navigation of the craft, illustrated in FIG. 2, by:

O: origin, the point on the ground situated on the estimated vertical of the phase center of the SAR antenna;

Z: the upward vertical passing through the estimated position of the phase center of the SAR antenna;

X and Y: two perpendicular directions contained in the horizontal plane beneath the craft, which are such that the estimated relative velocity $\vec{V}_s$ of the antenna is contained in the plane XOZ and is directed towards the positive x axis.

The estimated coordinates of the position of the phase center of the SAR antenna 14 are therefore, in this reference frame:

$$\hat{P}_s = \begin{vmatrix} \hat{X}_s \\ \hat{Y}_s \\ \hat{Z}_s \end{vmatrix} = \begin{vmatrix} O \\ O \\ \hat{Z}_o \end{vmatrix} \quad (4)$$

where the estimated altitude $\hat{Z}_O$ is positive, the index S being used for the SAR radar.

The estimated coordinates of the relative velocity of the antenna 14 are:

$$\hat{V}_s = \begin{vmatrix} \hat{V}_x \\ \hat{V}_y \\ \hat{V}_z \end{vmatrix} = \begin{vmatrix} \hat{V}_x \\ 0 \\ \hat{V}_z \end{vmatrix} \quad (5)$$

The estimated ortho-velocity is likewise defined by:

$$\hat{V}_\perp = \begin{vmatrix} -\hat{V}_z \\ 0 \\ \hat{V}_x \end{vmatrix} \quad (6)$$

Transfer from the estimated coordinates of the position and velocity of the craft, which are provided nominally by the facility 10, to the estimated coordinates of the position and velocity of the phase center of the SAR antenna 14 can be performed using the classical relations for summing motions by taking into account lever arms between the center of gravity of the craft and the phase center of the antenna, as well as the estimated speeds of rotation of the craft.

Modeling of the geometry of SAR image capture

It is desired to image the ground around a point $\hat{M}_O$ defined by:

$$\hat{P}_M = \begin{vmatrix} \hat{X}_M \\ \hat{Y}_M \\ \hat{Z}_M \end{vmatrix} \quad (7)$$

Assuming the unevenness of the terrain to be sufficiently slight in the vicinity of the overflown and imaged zone, we will therefore have $\hat{Z}_M = 0$.

This point $\hat{M}_O$ can, in an equivalent manner, be defined by an estimated direction of sight $\vec{\hat{R}}_O$ such that:

$$\vec{R}_o = \overrightarrow{\hat{P}_s \hat{P}_M} = \begin{vmatrix} \hat{X}_M \\ \hat{Y}_M \\ -\hat{Z}_o \end{vmatrix} \quad (8)$$

Owing to the presence of inertial errors in position and in velocity, the point Mo actually imaged will be defined by:

$$P_M = \begin{vmatrix} \hat{X}_M + \delta_x \\ \hat{Y}_M + \delta_y \\ 0 \end{vmatrix} \quad (9)$$

Modeling of the alignment deviation

In accordance with the invention, the alignment deviation $\delta$ can be modeled in the form of an observation function of the inertial errors of the craft at the instant of production of the SAR image, which can be expressed in the following form:

$$\delta = \begin{vmatrix} \delta x \\ \delta y \end{vmatrix} = \begin{vmatrix} \Delta X + f(\Delta Z, \Delta V) + \eta_x \\ \Delta Y + g(\Delta Z, \Delta V) + \eta_y \end{vmatrix} \quad (10)$$

an expression in which:

$\Delta X$ and $\Delta Y$ represent the inertial error in position of the craft in the two reference directions X and Y;

$\Delta Z$ represents the inertial error in altitude of the craft;

$\Delta V$ represents the vector of inertial errors in velocity of the vehicle; and $f(\Delta Z, \Delta V)$ and $g(\Delta Z, \Delta V)$ are two scalar functions, known analytically.

A finite expansion makes it possible to rewrite:

$$\delta = \begin{vmatrix} \delta x \\ \delta y \end{vmatrix} = \begin{vmatrix} \Delta X + \alpha_1 \cdot \Delta Z + \alpha_2 \cdot \Delta Z^2 + \alpha_3 \cdot \Delta Z^3 + \vec{A} \cdot \vec{\Delta V} + \eta_x \\ \Delta Y + \beta_1 \cdot \Delta Z + \beta_2 \cdot \Delta Z^2 + \beta_3 \cdot \Delta Z^3 + \vec{B} \cdot \vec{\Delta V} + \eta_y \end{vmatrix} \quad (11)$$

with:

$$\alpha_1 = \frac{\hat{V}_z}{\hat{V}_x} \quad \alpha_2 = 0 \quad \alpha_3 = 0$$

$$\beta_1 = \frac{\vec{R}_o \cdot \vec{V}_\perp}{\hat{Y}_M \cdot \hat{V}_x} \quad \beta_2 = -\frac{\|\vec{R}_o \wedge \vec{V}_s\|^2}{2\hat{Y}_M^3 \cdot \hat{V}_x^2} \quad \beta_3 = -\frac{\beta_1 \cdot \beta_2}{\hat{Y}_M}$$

$$\vec{A} = -\frac{1}{\hat{V}_x} \cdot \hat{R}_o \quad \vec{B} = \frac{\hat{X}_M}{\hat{Y}_M \cdot \hat{V}_x} \cdot \vec{R}_o$$

All the above terms $\alpha i$, $\beta i$, $\vec{A}$ and $\vec{B}$ therefore depend only on the kinematics of the estimated trajectory and on the estimated coordinates of the sighted point on the ground. They can all be easily computed numerically and can be found by those skilled in the art.

The variables $\hat{V}_x$ and $\hat{Y}_M$ appearing in the denominator of some of these terms in fact reflect the impossibility of producing an SAR image with a zero horizontal velocity ($\hat{V}_x = 0$) and the impossibility of imaging a point on the ground beneath the track of the craft ($\hat{Y}_M = 0$).

It is therefore noted that the alignment deviation is independent of the inertial errors in attitude of the craft. This is due to the fact that, in practice, these errors in attitude of the craft will, through the summing of the motions, generate only very slight errors in position and in velocity of the SAR antenna, which errors will be totally drowned within the measurement noise $\eta$.

The covariance matrix $\Sigma\eta$ of the measurement noise $$\eta = \begin{vmatrix} \eta_x \\ \eta_y \end{vmatrix}$$

can be expressed in the form:

$$\Sigma\eta = \begin{bmatrix} \sigma_a^2 + \sigma_h^2 + \beta_1^2 \cdot \sigma_z^2 & \beta_1 \cdot \beta_2 \cdot \sigma_z^2 \\ \beta_1 \cdot \beta_2 \cdot \sigma_z^2 & \sigma_a^2 + \sigma_h^2 + \beta_2^2 \cdot \sigma_z^2 \end{bmatrix} \quad (12)$$

an expression in which:

$\sigma_a$ is the estimated standard deviation of the numerical noise of the alignment procedure, and $\sigma_h$ and $\sigma_z$ are respectively the estimated standard deviations of the horizontal and vertical location errors of the reference map.

Adjustment of navigation

Actual adjustment of navigation amounts in fact to estimating, at the instant of adjustment, the various inertial errors in position $\Delta P$ and in velocity $\Delta V$ of the craft, based on observation of the alignment deviation $\delta$.

Let $\Delta\hat{P}$ and $\Delta\hat{V}$ be these error estimates. Adjustment of navigation then consists in updating the estimates of the position and velocity of the craft according to the formulae:

$$\hat{P}^+ = \hat{P}^- + \Delta\hat{P} \quad (13)$$

$$\hat{V}^+ = \hat{V}^- + \Delta\hat{V}$$

in which the exponent "+" indicates a post-adjustment estimate and the exponent "−" a pre-adjustment estimate.

Using the state vector U introduced earlier, this updating or adjustment can be written:

$$\hat{U}^+ = \hat{U}^- + \Delta\hat{U} \quad (14)$$

The adjustment procedure therefore consists in estimating as accurately as possible six unknowns, $\Delta P$ and $\Delta V$, having available only two observations, $\delta x$ and $\delta y$.

The first conceivable method is the known solution of this problem: it consists in neglecting, in the observation $\delta$, all the effects of the inertial errors in altitude and in velocity and the effects of measurement noise, putting directly:

$$\delta = \begin{vmatrix} \delta X \\ \delta Y \end{vmatrix} = \begin{vmatrix} \Delta \cdot X \\ \Delta \cdot Y \end{vmatrix} \quad (15)$$

This amounts to saying that the alignment deviation $\delta$ is wholly equated with an inertial error in position in the horizontal plane XOY.

This method, likely to be the simplest imaginable, is, however, inaccurate.

Indeed, if there are inertial errors in altitude and in velocity, these will directly impair the accuracy of this adjustment. Altitude errors of the order of a hundred meters, or relative errors in velocity of the order of a few %, may very easily induce errors of adjustment of a few hundred meters in the horizontal plane.

Conversely, this method will never allow estimation of the inertial errors in altitude and in velocity of the craft.

Moreover, since the statistics of the measurement noise are not taken into account, this method is in danger of lacking robustness; if the measurement noise becomes too great, adjustment may lead to impairment of navigation.

This method cannot therefore be envisaged when a high degree of accuracy and/or satisfactory certainty of adjustment are required.

First method of adjustment according to the invention

The first method according to the invention consists in retaining only the linear terms, as a function of the inertial errors in position and in velocity, as well as the measurement noise in the alignment deviation $\delta$ which can then be expressed as follows:

$$\delta = \begin{vmatrix} \delta X \\ \delta Y \end{vmatrix} \approx \begin{vmatrix} \Delta X + \alpha_1 \cdot \Delta Z + \vec{A} \cdot \vec{\Delta V} + \eta_x \\ \Delta Y + \beta_1 \cdot \Delta Z + \vec{B} \cdot \vec{\Delta V} + \eta_y \end{vmatrix} \quad (16)$$

It is then possible to define the observation matrix H of size 2×6 by:

$$H = \begin{bmatrix} 1 & 0 & \alpha_1 & \vec{A}^t \\ 0 & 1 & \beta_1 & \vec{B}^t \end{bmatrix} \quad (17)$$

This matrix is such that the alignment deviation $\delta$ can be expressed very simply as a function of the estimation error $\Delta U$ in the state vector U by:

$$\delta \approx H.\Delta U + \eta \quad (18)$$

In the latter form, the problem is therefore one of linear observation distorted by errors, estimation of which is sought.

The solution to this problem is then the use of a method of estimation, termed least squares, calling upon the recursive form of a KALMAN-BUCY filter.

An estimate a $\Delta^\wedge U$ of $\Delta U$ which minimizes the covariance of the residual error is thus equal to:

$$\Delta^\wedge U = K.\delta \quad (19)$$

the gain matrix K, of size 6×2, of the KALMAN-BUCY filter being equal to:

$$K = \Sigma_U^- . H^t . (H . \Sigma_U^- . H^t + \Sigma\eta)^{-1} \quad (20)$$

an expression in which $\Sigma_U^-$ denotes the covariance matrix of the error $\Delta U$, defined by the relation (3), before adjustment.

The residual estimation error $\Delta U$ is equal, after adjustment, to:

$$\Delta U^+ = \Delta U^- - \Delta^\wedge U \quad (21)$$

and its associated covariance matrix is:

$$\Sigma_U^+ = (I_6 - K.H) . \Sigma_U^- \quad (22)$$

with $I_6$ denoting the identity matrix of size 6×6.

The recursive form of this filter and, in particular, computation of the covariance matrix of the residual errors thus makes it possible to perform several successive adjustments based on the acquisition and alignment of several SAR images.

This method turns out to be much more effective and accurate than the known method and has the following advantages:

- complete adjustment of the inertial errors in position and in velocity;
- inclusion of the statistics of the measurement noise;
- minimization of the residual error of adjustment;
- possible use with inertial errors in altitude of the order of a few tens of meters;
- possible use with large inertial errors in velocity, of the order of a few % to a few tens of % relative.

However, this method does not take into account the non-linearities in the alignment deviation $\delta$ which are due to the inertial error in altitude $\Delta Z$. Its use will therefore be limited to reasonable inertial errors in altitude of the order of a hundred meters at most, depending on the conditions of the kinematics and of the geometry of SAR image capture, and depending on the desired accuracy of adjustment.

The invention proposes a second method of adjustment making it possible to take into account the nonlinear terms of the model of alignment deviation.

Second method of adjustment according to the invention

The second method of adjustment in accordance with the present invention makes it possible to take fully into account the non-linearities due to the inertial altitude errors through the use of two successive estimations.

First iteration

The first gain matrix, denoted K1, of size 6×2, is defined by:

$$K_1 = \Sigma_U^- . H^t . (H . \Sigma_U^- . H^t + \Sigma\eta + \Sigma_z)^{-1} \quad (23)$$

an expression in which:

- $\Sigma_U^-$ still denotes the covariance matrix of the inertial errors $\Delta U$ before adjustment;
- H still denotes the observation matrix of size 2×6 defined by the relation (17);
- $\Sigma_z$ is a covariance matrix making it possible to take into account the non-linearities in the measurement $\delta$ in the form of pseudo-noise, according to the expression:

$$\Sigma_z = \begin{bmatrix} 0 & 0 \\ 0 & 2\beta_2^2 \cdot \sigma_{\Delta z}^4 \end{bmatrix} \quad (24)$$

in which:

- $\rho_{\Delta z}^2$ is the variance of the inertial error in altitude $\Delta Z$ before adjustment, that is to say the third element of the diagonal of $\Sigma_U^-$.

Calculation of the first estimate of the inertial errors

A first estimate $\hat{\Delta U}$ of the inertial errors $\Delta U$ is then obtained, expressed according to the expression:

$$\Delta \bar{U} = K_1 \cdot \begin{vmatrix} \delta_x \\ \delta_y - \beta_2 \cdot \sigma_{\hat{\Delta}z}^2 \end{vmatrix} \quad (25)$$

in which the corrective term $\beta_2.\sigma_{\hat{\Delta}z}^2$ makes it possible to obtain a residual error $$dU = \Delta U - \Delta \bar{U} \quad (26)$$

whose mean is zero.

The covariance $\Sigma^*_U$ of this residual error $dU$ is then obtained by:

$$\Sigma^*_U = (I_6 - K_1.H).\Sigma_U^{-} \quad (27)$$

Second iteration

A pseudo-measurement $\delta^*$ such that:

$$\delta^* = \delta - H \cdot \Delta \tilde{U} - \begin{vmatrix} 0 \\ \beta_2 \cdot \bar{\Delta}^2 Z + \beta_3 \cdot \bar{\Delta}^3 Z \end{vmatrix} \quad (28)$$

is constructed from the first estimate $\Delta \hat{U}$. In this expression, $\Delta \hat{Z}$ corresponds to the first estimate of the inertial error in altitude, that is to say to the third component of the vector $\Delta \hat{U}$.

This pseudo-measurement $\delta^*$ then satisfies the formula:

$$\delta^* \approx H^*.dU + \eta \quad (29)$$

in which the observation pseudo-matrix $H^*$, of size 2×6, is equal to:

$$H^* = H + \begin{vmatrix} 0 & 0 & 0 & 0 & 0 & 0 \\ 0 & 0 & 2\beta_2 \cdot \bar{\Delta}Z + 3\beta_3 \cdot \bar{\Delta}^2 Z & 0 & 0 & 0 \end{vmatrix} \quad (30)$$

Computation of the second estimate of the inertial errors

The second estimate $d\hat{U}$ of the inertial errors is then obtained in a classical manner through the formula:

$$d\bar{U} = K_2.\delta\delta \quad (31)$$

in which the second gain matrix $K_2$, of size 6×2, is defined by:

$$K_2 = \Sigma^*_U.H^{*t}.(H^*.\Sigma^*_U.H^{*t} + \Sigma\eta)^{-1} \quad (32)$$

The estimated global inertial error $\Delta \hat{U}$ is then equal to:

$$\Delta \hat{U} = \Delta \bar{U} + d\bar{U} \quad (33)$$

and the covariance matrix $\Sigma_U^+$ of the residual error $\Delta U^+$ after adjustment is defined by the following formulae:

$$\Delta U^+ = \Delta U - \Delta \hat{U} \quad (34)$$

$$\Sigma_U^+ = (I_6 - K_2.H^*).\Sigma^*_U \quad (35)$$

The first iteration of this method is very similar to the computations of the first method presented earlier, but includes the following advantages:

introduction of the pseudo-noise $\Sigma_z$ from non-linearities, which makes it possible to remove estimation divergences noted when the measurement noise $\Sigma\eta$ is slight, this correction then precluding the estimator from ascribing too high a confidence to the measurement;

recentering the measurement through the corrective term $\beta_2.\delta_{\hat{A}z}^2$, which makes it possible to obtain a centered estimation error, which is not the case with the first method.

The second iteration of this second method amounts, in fact, to using a second measurement $\delta^*$ not requiring the generation and alignment of a second SAR image.

It is therefore a relatively inexpensive step in terms of the volume of processing, yet affording an extra order of magnitude to the accuracy of the adjustment.

It is important to note that the expansion to order 3 of the influence of the inertial errors in altitude is not necessary only for reasons of accuracy of adjustment, but its purpose is above all to guarantee sure convergence of the estimation, something which an expansion to order 2 does not always allow, this being for a negligible computational overhead.

It is possible to further iterate the procedure.

In practice, the gain in accuracy afforded by the succeeding iteration loops is negligible. Indeed, it is observed that the accuracy of adjustment which is obtained after these two iterations is sufficiently good to drown the residual non-linearities in the measurement noise, and this even with initial errors in altitude of the order of a few kilometers.

Finally, for slight but reasonable inertial altitude errors, of the order of a hundred meters, the non-linearities in the measurement $\delta$ are in general masked by the measurement noise. Under these conditions, computation of the estimate inertial error may be limited to the first iteration and gives results which are very comparable to those obtained by the second method described above.

The complete and accurate adjustment of all six errors in position and in velocity must necessarily be based on several acquisitions and alignments of SAR images produced under independent geometrical sighting conditions, that is to say with observation matrices $H$ forming a system with rank at least equal to 6. The recursive form of the processing operations performed makes it possible readily to take into account several successive adjustments.

The system just described has numerous advantages:

accuracy of location is excellent, since it is of the order of magnitude of the resolution of the SAR image;

it is not necessary to have available a priori a good estimation of the altitude or of the velocity of the craft in order to perform the adjustment of navigation. In particular, it is not necessary to load an altimeter on board the craft;

the adjustment of navigation is performed in a manner which is optimal in the sense of the covariance of the residual error;

complete adjustment of the errors in position, including altitude, can be carried out using at most two SAR images acquired under geometrically independent conditions, and using a single image if the error in altitude is sufficiently slight;

complete adjustment of the errors in position and in velocity can be carried out using at most three SAR images acquired under geometrically independent conditions;

optimal adjustment of navigation after the acquisition of each SAR image makes it possible to benefit from better inertial knowledge in respect of the production of succeeding SAR images;

the adjustment is robust to scatter in the system by virtue of the use of a stochastic filter which takes the statistics of this scatter into account;

the computational overhead of the method of adjustment in accordance with the invention is not substantial in comparison to the simpler methods; this overhead is, in particular, negligible, given the computational burden required for the proper processing of an SAR image.

Although, in the preceding examples, expansions of the scalar functions f(ΔZ, ΔV) and g(ΔZ, ΔV) were given to orders which were limited to 3 in ΔZ and to 1 in ΔV, it goes without saying that, without departing from the scope of the present invention, said scalar functions could be expanded to higher orders, the first estimate Δ~U of the vector of estimation errors, the pseudo-measurement δ* of the alignment deviation and the second estimate d~U of the vector of estimation errors being obtained by adapting the computations to the expansion adopted, as those skilled in the art will be able to do.

It goes without saying that the adjustment of navigation in accordance with the present invention can also be used to calibrate the defects of the inertial facility used, in flight.

I claim:

1. An on-board navigation system for an aerial vehicle of the type including an inertial navigation facility (10) delivering an estimation of the position and velocity of the vehicle with respect to the terrestrial surface, a SAR synthetic aperture sideways looking radar (12) producing a SAR radar image of the territory in the vicinity of the point (Mo) overflown by the vehicle, memory means (16) containing a reference map of the territory overflow, means (17) for comparison based on alignment of said SAP, radar image produced in flight with the stored reference map and providing an alignment deviation δ in two perpendicular directions and computing means (18) linked to the memory means (16), to the inertial navigation facility (10) and to the means of comparison (17), which include filter means of the KALMAN type, and which deliver an inceptor to the KALMAN filter for the estimation of the inertial errors in position and in velocity as a function of the alignment deviation δ, wherein said computing means (18) express the alignment deviation as a function of the estimation error vector ΔU associated with the state vector U consisting of the components of the vectors P, V for the position and relative velocity of the vehicle, in accordance with the following equation:

$$\delta = \begin{vmatrix} \delta x \\ \delta y \end{vmatrix} = \begin{vmatrix} \Delta X + f(\Delta Z, \Delta V) + \eta_x \\ \Delta Y + g(\Delta Z, \Delta V) + \eta_y \end{vmatrix}$$

in which:

η is the vector of alignment error in two perpendicular directions η$x$, η$y$;

ΔX and ΔY represent the inertial error in position of the vehicle in two horizontal perpendicular directions;

ΔZ represents the inertial error in altitude of the vehicle;

ΔV represents the vector of inertial errors in velocity of the vehicle; and f(ΔZ, ΔV) and g(ΔZ, ΔV) are two scalar functions; and wherein the filter is a KALMAN-BUCY filter with gain matrix K such that the estimate Δ~U of the vector of estimation error is equal to Δ~U=K.δ.

2. The system as claimed in claim 1, wherein said scalar functions f(ΔZ, ΔV) and g(ΔZ, ΔV) have an observed alignment deviation in accordance with the following equation:

$$\delta = \begin{vmatrix} \delta X \\ \delta Y \end{vmatrix} = \begin{vmatrix} \Delta X + \alpha_1 \cdot \Delta Z + \vec{A} \cdot \vec{\Delta V} + \eta x \\ \Delta Y + \beta_1 \cdot \Delta Z + \vec{B} \cdot \vec{\Delta V} + \eta y \end{vmatrix}$$

having the following observation matrix $$H = \begin{vmatrix} 1 & 0 & \alpha_1 & \vec{A}^t \\ 0 & 1 & \beta_1 & \vec{B}^t \end{vmatrix}$$

in which the terms α1, β1, $\vec{A}$ and $\vec{B}$ depend only on the kinematics and the estimated trajectory and on the estimated coordinates of the sighted point on the ground, and wherein the gain matrix of the KALMAN-BUCY filter equals $$K = \Sigma_U^- \cdot H^t \cdot (H \cdot \Sigma_U^- \cdot H^t + \Sigma \eta)^{-1}$$

where $E_U^-$ denotes the covariance matrix of the vector of estimation errors before adjustment, Ση denotes the covariance matrix of the alignment error vector, and wherein a post-adjustment residual estimation error ΔU$^+$ is determined according to the formula:

$$\Delta U^+ = \Delta U^- - \Delta^\sim U$$

and having the following covariance matrix $\Sigma_U^+$:

$$\Sigma_U^+ = (I - K.H).\Sigma_U^-$$

where I denotes the identity matrix.

3. The system as claimed in claim 1, wherein said scalar functions f(ΔZ, ΔV) and g(ΔZ, ΔV) have an observed alignment deviation in accordance with the following equation:

$$\delta = \begin{vmatrix} \delta X \\ \delta Y \end{vmatrix} = \begin{vmatrix} \Delta X + \alpha_1 \cdot \Delta Z + \alpha_2 \cdot \Delta Z^2 + \alpha_3 \cdot \Delta Z^3 + \vec{A} \cdot \vec{\Delta V} + \eta x \\ \Delta Y + \beta_1 \cdot \Delta Z + \beta_2 \cdot \Delta Z^2 + \beta_3 \cdot \Delta Z^3 + \vec{B} \cdot \vec{\Delta V} + \eta y \end{vmatrix}$$

having the following observation matrix $$H = \begin{vmatrix} 1 & 0 & \alpha_1 & \vec{A}^t \\ 0 & 1 & \beta_1 & \vec{B}^t \end{vmatrix}$$

the terms α$i$, β$i$, $\vec{A}$ and $\vec{B}$ depending on the kinematics of the estimated trajectory and on the estimate coordinates of the sighted point on the ground, and wherein a first estimate $_\Delta U$ of the vector of estimation errors is equal to:

$$_\Delta U = K_1 \cdot \begin{vmatrix} \delta_x \\ \delta_y - \beta_2 \cdot \sigma_\Delta^2 Z \end{vmatrix}$$

with $\delta_{\Delta Z}^2$ denoting the variance of the inertial error in altitude ΔZ before adjustment and with K1 which represents a first gain matrix of the KALMAN-BUCY filter and which is equal to:

$$K_1 = \Sigma_U^- \cdot H^t \cdot (H \cdot \Sigma_U^- \cdot H^t + \Sigma \eta + \Sigma_z)^{-1}$$

$\Sigma_U^-$ denoting the covariance matrix of the vector of estimation errors before adjustment, Ση denoting the covariance matrix of the alignment error vector, and $\Sigma_z$ is a matrix which is equal to:

$$\Sigma_z = \begin{vmatrix} 0 & 0 \\ 0 & 2\beta_2^2 \cdot \sigma_{\Delta Z}^4 \end{vmatrix}$$

and a first residual estimation error $dU$ being determined according to the formula $$dU = \Delta U - {}_\Delta \hat{U}$$

its covariance matrix $\Sigma^*_U$ being equal to $$\Sigma^*_U = (I - K_1 . H) . \Sigma_U^-$$

with $I$ denoting the identity matrix.

4. The system as claimed in claim 3, additionally comprising means for computing, from said first estimate ${}_\Delta \hat{U}$ of the vector of estimation error, a pseudo-measure $\delta^*$ of the alignment deviation such that:

$$\delta^* = \delta - H \cdot {}_\Delta \hat{U} - \begin{vmatrix} 0 \\ \beta_2 \cdot {}_\Delta \hat{Z}^2 + \beta_3 \cdot {}_\Delta \hat{Z}^3 \end{vmatrix}$$

with ${}_\Delta \hat{Z}$ denoting the altitude component of said first estimate, and such that $$\delta^* \approx H^* . dU + \eta$$

and having the following observation pseudo-matrix $H^*$ which is equal to $$H^* = H + \begin{vmatrix} 0 & 0 & 0 & 0 & 0 & 0 \\ 0 & 0 & 2\beta_2 \cdot {}_\Delta \hat{Z} + 3\beta_3 \cdot {}_\Delta \hat{Z}^2 & 0 & 0 & 0 \end{vmatrix}$$

a second estimate $d_0$ of the vector of estimation errors is equal to $$d_0 = K_2 . \delta^*$$

with $K_2$ denoting a second gain matrix of the KALMAN-BUCY filter and which is equal to $$K_2 = \Sigma^*_U . H^{*t} . (H^* . \Sigma^*_U . H^{*t} + \Sigma \eta)^{-1}$$

and the means of adjustment determine a global estimation $\Delta \hat{U}$ according to the formula $$\Delta \hat{U} = {}_\Delta \hat{U} + d_0$$

the covariance matrix $\Sigma_U^+$ of the residual error $\Delta U^+$ after adjustment being defined by the formulae $$\Delta U^+ = \Delta U - \Delta \hat{U},$$

$$\Sigma_U^+ = (I - K_2 . H^*) . \Sigma^*_U$$

5. The system as claimed in claim 3, wherein the covariance matrix $\Sigma \eta$ of the alignment error vector is equal to:

$$\Sigma \eta = \begin{vmatrix} \sigma_a^2 + \sigma_h^2 + \beta_1^2 \cdot \sigma_z^2 & \beta_1 \cdot \beta_2 \cdot \sigma_z^2 \\ \beta_1 \cdot \beta_2 \cdot \sigma_z^2 & \sigma_a^2 + \sigma_h^2 + \beta_2^2 \cdot \sigma_z^2 \end{vmatrix}$$

with $\delta_a$ denoting the estimated standard deviation of the numerical noise of the alignment procedure, and $\delta_h$ and $\delta_z$ denoting respectively the estimated standard deviations of the horizontal and vertical location errors of the reference map.

6. The system as claimed in claim 2, wherein the terms $\alpha i$, $\beta i$, and $\vec{A}$ and $\vec{B}$ are determined according to the following relations:

$$\alpha_1 = \frac{\hat{V}_z}{\hat{V}_x} \quad \alpha_2 = 0 \quad \alpha_3 = 0$$

$$\beta_1 = \frac{\vec{R}_o \cdot \vec{V}_\perp}{\hat{Y}_m \cdot \hat{V}_x} \quad \beta_2 = -\frac{\|\vec{R}_o \wedge \vec{V}_s\|^2}{2\hat{Y}_M^3 \cdot \hat{V}_x^2} \quad \beta_3 = -\frac{\beta_1 \cdot \beta_2}{\hat{Y}_M}$$

$$\vec{A} = -\frac{1}{\hat{V}_x} \cdot \vec{R}_o \quad \vec{B} = \frac{\hat{X}_M}{\hat{Y}_M \cdot \hat{V}_x} \cdot \vec{R}_c$$

in which:

$$\hat{V}_s = \begin{vmatrix} \hat{V}_x \\ \hat{V}_y \\ \hat{V}_z \end{vmatrix}$$

is the estimate of the relative velocity of the SAR antenna of the radar, the estimated coordinates of the phase center of which are:

$$\hat{P}_s = \begin{vmatrix} \hat{X}_s \\ \hat{Y}_s \\ \hat{Z}_s \end{vmatrix}$$

$\hat{V}_\perp$ is the ortho-velocity equal to $$\hat{V}_\perp = \begin{vmatrix} -\hat{V}_z \\ \hat{V}_y \\ \hat{V}_x \end{vmatrix}$$

$\vec{R}_o = \vec{\hat{P}}_s \vec{\hat{P}}_M$ is the direction of sighting of the point $\hat{M}$ on the ground with coordinates $$\hat{P}_M = \begin{vmatrix} \hat{X}_M \\ \hat{Y}_M \\ \hat{Z}_M \end{vmatrix}$$

the values $\hat{P}_s$, $\hat{V}_s$, $\hat{V}_\perp$, $\hat{P}_M$, $\vec{R}_o$ being expressed in an orthonormal reference frame $T = (O, X, Y, Z)$ defined at the estimated current point of the trajectory by:

O: origin, point on the ground at the estimated vertical of the phase center of the SAR antenna;

Z: upward vertical passing through the estimated position of the phase center of the SAR antenna;

X and Y: in the horizontal plane beneath the craft, such that the estimated relative velocity $\vec{\hat{V}}_s$ of the antenna is contained in the plane (XOZ) and is directed towards the positive x axis, these values $\hat{P}_s, \hat{V}_s, \hat{V}\perp, \hat{P}_M, \vec{R}o$ being, in a reference frame, equal to:

$$\hat{P}_s = \begin{vmatrix} 0 \\ 0 \\ \hat{Z}_o \end{vmatrix} \quad \hat{V}_s = \begin{vmatrix} \hat{V}_x \\ 0 \\ \hat{V}_z \end{vmatrix} \quad \hat{V}\perp = \begin{vmatrix} -\hat{V}_z \\ 0 \\ \hat{V}_x \end{vmatrix}$$

-continued $$\hat{P}_M = \begin{vmatrix} \hat{X}_M \\ \hat{Y}_M \\ 0 \end{vmatrix} \quad \text{and} \quad \vec{R}o = \begin{vmatrix} \hat{X}_M \\ \hat{Y}_M \\ -\hat{Z}_o \end{vmatrix}$$

* * * * *